E. W. KOLB.
CAR WINDOW SCREEN.
APPLICATION FILED FEB. 23, 1911.

1,042,123.

Patented Oct. 22, 1912.

Witnesses
J. C. Budden
M. E. E. Hail

Inventor
Edward William Kolb.
By Hamburg a Sudden
attorney

UNITED STATES PATENT OFFICE.

EDWARD WILLIAM KOLB, OF WESTMOUNT, QUEBEC, CANADA.

CAR-WINDOW SCREEN.

1,042,123.   Specification of Letters Patent.   Patented Oct. 22, 1912.

Application filed February 23, 1911. Serial No. 610,233.

*To all whom it may concern:*

Be it known that I, EDWARD WILLIAM KOLB, a citizen of the United States of America, and residing at No. 358 Grosvenor avenue, Westmount, Province of Quebec, Dominion of Canada, have invented certain new and useful Improvements in Car-Window Screens, of which the following is a specification.

My invention relates to ventilators for passenger cars and more particularly to sleeping car ventilators, and has for its object an improved car window screen.

Hitherto the lower berths of sleeping cars have been ventilated by means of a wire screen being inserted when the window is partially opened. By this means it was possible to admit air but no provision was made to draw air out from the interior of the car or to provide means for controlling the amount of air to be admitted.

My invention supplies a means of both drawing the air out and also of bringing air in under control.

Reference is made to the annexed drawings in which—

Figure 1:
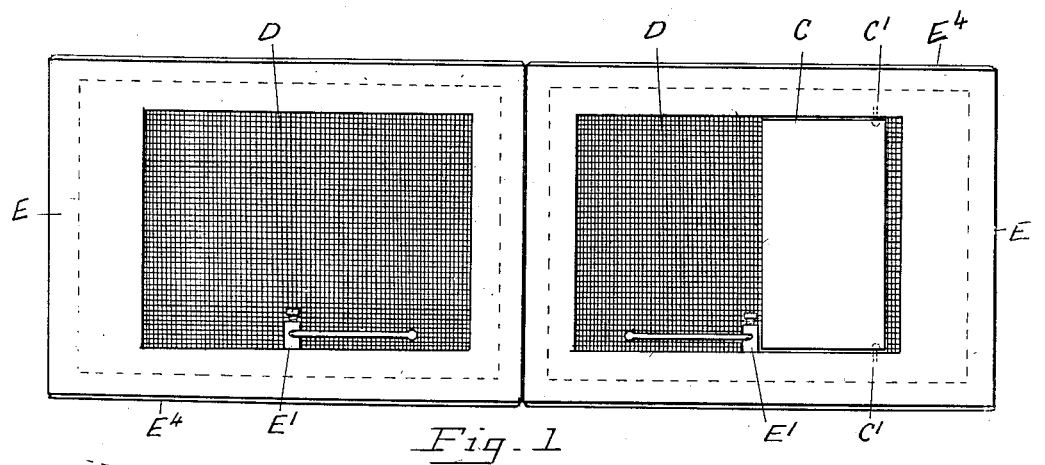
Figure 2:
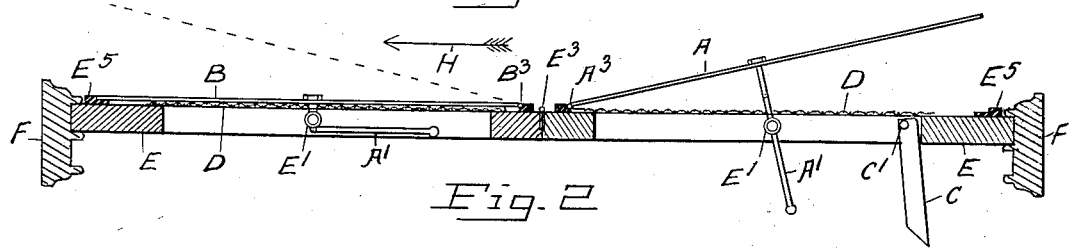
Figure 3:
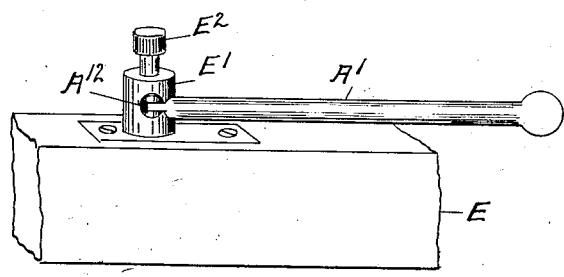

Figure 1. shows a view of the device from the inside. Fig. 2. is a horizontal cross section. Fig. 3. is a detail of adjustment device.

The frame E is the usual form of screen in two parts hinged at $E^3$ and having a fine mesh wire gauze D covering both apertures on the outside. The usual rubber pads $E^4$ are attached to the top and bottom of the frame E.

To the right hand part of the frame E a shutter A is hinged vertically at $A^3$ close to the hinge $E^3$. A rubber pad $E^5$ on the frame E meets the edges of the shutter A when closed. An adjustment bar $A^1$ is secured to the shutter A at $A^4$ and passes through the post $E^1$ secured to the frame E. An adjustment screw $E^2$ binds the bar at any desired position. The bar $A^1$ is hinged at $A^{12}$ thereby providing a lock to the shutter when closed and also enabling the end of the bar to be turned out of the way.

A baffle plate C is hinged at $C^1$ to the inner edge of the frame E as shown.

The left hand part of the frame E has a shutter B hinged vertically at $B^3$ and has a rubber pad, adjustment bar and binding post as above described.

The frame E when extended fits exactly into the grooves of the window frame F and the window is lowered against the upper edge of the frame E as in the present practice.

The operation of my invention is as follows: When the train is traveling in the direction shown by the arrow H if the shutter A is opened the air outside striking the outside of the shutter A provides a suction or exhaust through the aperture about the shutter from within thereby drawing the air from the interior of the car. When the shutter B is opened air is forced into the car and the amount is regulated by adjusting the position of the shutter B. When both shutters are opened and the baffle C is swung inwardly the greater part of the air that comes in through the aperture of the shutter B is deflected out through the aperture of the shutter A and gentle ventilation is secured.

Having now described my invention and how it is to operate what I claim and desire to secure by Letters Patent is:

1. A car window screen having a frame in two sections hinged together in the middle of said frame, in combination with a pair of shutters hinged at their proximate ends to said frame sections respectively near such middle point and opening outward and an inwardly opening deflector plate hinged to said frame near the rear end thereof, the same being arranged to receive the impact of the air directed inwardly by the forward shutter and to deflect the same outwardly through the rearward screen substantially as set forth.

2. A car window screen having a frame in two sections hinged together in the middle of said frame, in combination with a pair of shutters hinged at their proximate ends to said frame sections respectively near such middle point and opening outwardly, an inwardly opening deflector hinged to said frame near the rear end thereof, the same being arranged to receive the impact of the air directed inwardly by the forward shutter and to deflect the same outwardly through the rearward screen, and means for adjusting the outward inclination of the forward shutter.

3. A car window screen having a frame in two sections hinged together in the middle of said frame, in combination with a pair of shutters hinged at their proximate ends to said frame sections respectively near such middle point and opening outwardly, an inwardly opening deflector hinged to said frame near the rear end thereof, the same being arranged to receive the impact of the air directed inwardly by the forward shutter and to deflect the same outwardly through the rearward screen and rods and clamping screws for adjusting independently the inclination of the two shutters.

Signed at Montreal, this fourth day of February 1911, in the presence of two witnesses.

EDWARD WILLIAM KOLB.

Witnesses:
HANBURY A. BUDDEN,
M. E. E. HAIL.